United States Patent [19]
Seniff et al.

[11] Patent Number: 5,516,089
[45] Date of Patent: May 14, 1996

[54] ADJUSTABLE WORKPIECE LOCATING UNIT

[75] Inventors: Dana W. Seniff, South Glastonbury; James M. Diener, Niantic, both of Conn.

[73] Assignee: Gerber Systems Corporation, South Windsor, Conn.

[21] Appl. No.: 366,978

[22] Filed: Dec. 30, 1994

[51] Int. Cl.⁶ .................................................. B23Q 3/00
[52] U.S. Cl. ........................ 269/304; 269/47; 269/99; 269/305; 269/315; 269/900; 269/903
[58] Field of Search ................................ 269/47, 95, 99, 269/100, 303, 304, 305, 315, 316, 317, 900

[56] References Cited

U.S. PATENT DOCUMENTS

| | | |
|---|---|---|
| 1,033,758 | 7/1912 | Howell . |
| 2,696,765 | 12/1954 | Appleton . |
| 3,395,439 | 8/1968 | Palesi et al. . |
| 4,445,678 | 5/1984 | George ...................................... 269/99 |
| 4,589,640 | 5/1986 | Pert .......................................... 269/203 |
| 4,618,131 | 10/1986 | Campisi et al. . |
| 4,711,438 | 12/1987 | Guarino . |
| 4,805,888 | 2/1989 | Bishop . |
| 4,861,011 | 8/1989 | Varga ........................................ 269/99 |
| 5,005,814 | 4/1991 | Gumbert . |

*Primary Examiner*—Bruce M. Kisliuk
*Assistant Examiner*—Thomas Lynch
*Attorney, Agent, or Firm*—McCormick, Paulding & Huber

[57] ABSTRACT

A workpiece locating unit is receivable in a T-slot formed in a workpiece supporting table member and provides a pin or other locating device cooperable with a locating feature on a workpiece to aid in accurately positioning the workpiece on the work supporting surface of the table member. The unit has four corners each providing an abutment surface for engagement with one or the other of two vertical slot surfaces. Two diagonally opposite ones of the abutment surfaces are rigid and the other two diagonally opposite ones of the abutment surfaces are resilient. The resilient abutment surfaces resiliently engage the two vertical surfaces of the slot and urge the unit about a vertical axis to hold the rigid abutment surfaces engaged with the vertical slot surfaces eliminating lateral looseness between the unit and the table member and providing accurate positioning of the locating device of the unit as the unit is moved from one position to another along the length of the slot.

21 Claims, 4 Drawing Sheets

ADJUSTABLE WORKPIECE LOCATING UNIT

FIELD OF THE INVENTION

This invention relates to a workpiece locating unit for use with a work supporting table member, the unit being slidably receivable in a T-slot formed in the table member, manually lockable at any position to which it may be moved along the length of the slot, and having a work locating device, such as a pin portion extending upwardly from the mouth of the slot beyond the supporting surface of the table member, to aid in accurately locating a workpiece on the supporting surface of the table member; and deals more specifically with such a unit including a slide body so constructed and so cooperating with the surfaces of the slot as to eliminate looseness between the slide body and the slot to keep the work locating device of the unit accurately located on the center line of the slot as it is moved to and locked at different positions along the length of the slot, the unit also including an easily manually operable means for securely locking the unit at any position along the length of the slot without injury to the slot surfaces.

BACKGROUND OF THE INVENTION

In many different manufacturing situations where a number of substantially identical workpieces are to be subjected to a work procedure common to all of the workpieces it is known to provide the workpieces with identically positioned locating features, such as holes and slots, and then during the involved work procedure to support each workpiece in turn on the supporting surface of a table member equipped with a number of pins or other locating devices which mate with the locating features of the workpiece to accurately locate the workpiece relative to the table member. This arrangement allows the workpieces to be quickly placed onto and removed from the table member while yet assuring the accurate placement of each workpiece. It is also known to make one or more of the locating devices used with the table member adjustable to different positions in the plane of the supporting surface to allow the table member and its workpiece locating devices to be set up to accommodate workpieces of different sizes and shapes and with differently positioned work locating features.

The work locating devices used with the table member may in some instances be designed to also aid in holding a workpiece to the supporting surface of the table member, but in many instances the locating devices are used to merely control the position of a workpiece in the plane of the supporting surface, while some other means, such as vacuum openings in the supporting surface of the table member, is used to hold the workpiece vertically in place.

The locating features provided on each workpiece and the complementary locating devices used with the table member may vary widely in shape and size. Commonly, however, the locating features provided on the workpieces are holes and slots and the complementary locating devices used with the table member are cylindrical pins extending upwardly from the supporting surface of the table member. Therefore, in the drawings and in the description and claims which follow the locating features of the workpieces are shown and referred to as holes and slots and the locating devices used with the table member are shown and referred to as pins. These terms should, however, be construed broadly as there is no intention to limit the invention in the broader aspects strictly to holes, slots and pins. Also, the locating devices are shown and described as ones serving to merely position a workpiece in the plane of the supporting surface, but there is likewise no intention to limit the invention to such devices and the invention may be applied as well to locating devices which also aid in holding a workpiece vertically to the supporting surface.

One application of the invention is in the optical inspection of printed circuit boards both in finished and partly finished states where for inspection a circuit board is positioned on the supporting surface of a table member constituting part of an automated optical inspection machine working under computer control. In this and many other applications it is necessary that the workpieces be very accurately located on the supporting surface. It has sometimes been difficult in the past to achieve the desired accuracy because of an adjustable locating unit being somewhat loosely received in a slot of the table member—that is, although the center line of the slot is accurately fixed relative to the supporting surface of the table member, when an adjustable locating unit is moved to a desired position along the length of the slot and then locked in place because of looseness between the locating unit and the slot the locating device portion of the unit may end up being not precisely located on the slot center line as wanted. Also the means for locking the unit in a given position is commonly a set screw carried by the unit and driven against the bottom surface of the slot for locking purposes. This causes marring of the slot bottom surface so that after repeated use of the table it may be difficult to accurately fix the locating unit at a desired position due to the set screw as it is driven onto the slot bottom surface tending to wander into a close-by indentation made in the surface during a previous locking procedure.

The object of the invention is therefore to provide a workpiece locating unit which when used in a complementary T-slot of a table member overcomes the above-mentioned problems by assuring accurate positioning of its locating device on the center line of the slot and which avoids marring of the slot bottom surface by the locking means to allow the unit to be accurately locked at any point along the length of the slot even after the unit has been previously moved to and locked at many different positions along the length of the slot.

Other objects and advantages of the invention will be evident from the following detailed description of preferred embodiments of the invention and from the accompanying drawings and claims.

SUMMARY OF THE INVENTION

The invention resides in a workpiece locating unit for use with a table member having a horizontal upwardly facing workpiece supporting surface and a T-slot, slidably receiving the unit, having a central axis running parallel to the supporting surface and a mouth communicating with the supporting surface. The T-slot has two downwardly facing guide surfaces located below and on opposite sides of the mouth and two vertical guide surfaces each extending downwardly from a respective one of the downwardly facing guide surfaces. The unit includes a slide body carrying a locating device, such as an upwardly projecting pin, and having a longitudinal axis generally parallel to the center line of the slot and two side portions extending parallel to the longitudinal axis and each located directly below a respective one of the downwardly facing surfaces of the slot. Each of the side portions of the slide body has one rigid abutment surface rigidly fixed relative to the remainder of the slide body and one resilient abutment surface resiliently moveable horizontally relative to the remainder of the slide body toward and away from the longitudinal axis. The two rigid abutment surfaces in the direction perpendicular to the longitudinal axis are spaced from one another by a distance less than the spacing between the two vertical surfaces of the slot and the two resilient abutment surfaces when the pin unit is out of the slot (that is, when the resilient abutment surfaces have no lateral forces applied to them) are spaced from one another in the direction perpendicular to the longitudinal axis by a distance greater than the spacing between the two vertical surfaces of the slot, and both the two rigid abutment surfaces and the two resilient abutment surfaces are spaced from one another in the direction of the longitudinal axis so that the two resilient abutment surfaces resiliently urge the slide body about a vertical axis to bring and hold the rigid abutment surfaces in engagement with the vertical surfaces of the slot, thereby eliminating lateral looseness which would otherwise likely exist between the slide body and the slot.

The invention also resides in the rigid abutment surfaces being arcuate about vertical axes of curvature and having identical radii of curvature and in the center axis of the locating device of the unit being vertical and passing through the middle point of the line connecting the two axes of curvature, thereby assuring location of the center axis of the locating device on the center line of the slot, assuming that center line to be situated midway between the vertical surfaces of the slot.

The invention also resides in the slide body carrying a locking means employing a locking member having a downwardly facing locking surface of relatively large area for engagement with the bottom surface of the T-slot, together with a simple manually operable means for moving the locking member toward and away from engagement with the bottom surface of the slot, to avoid marring of the slot bottom surface.

The invention also resides in still further details of the construction of the workpiece locating unit and of the T-slot of the table member with which it is used as stated in the accompanying claims.

DESCRIPTION OF THE PREFERRED EMBODIMENTS

Figure 1:
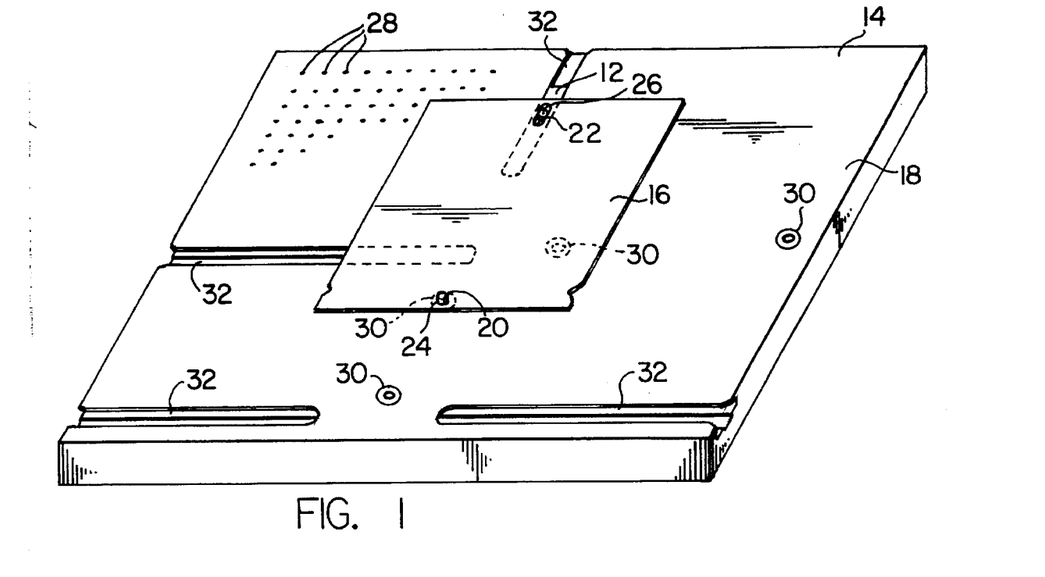
FIG. 1 is a perspective view showing a workpiece locating unit embodying this invention in use with a table member holding a circuit board for automated optical inspection purposes.
Figure 2:
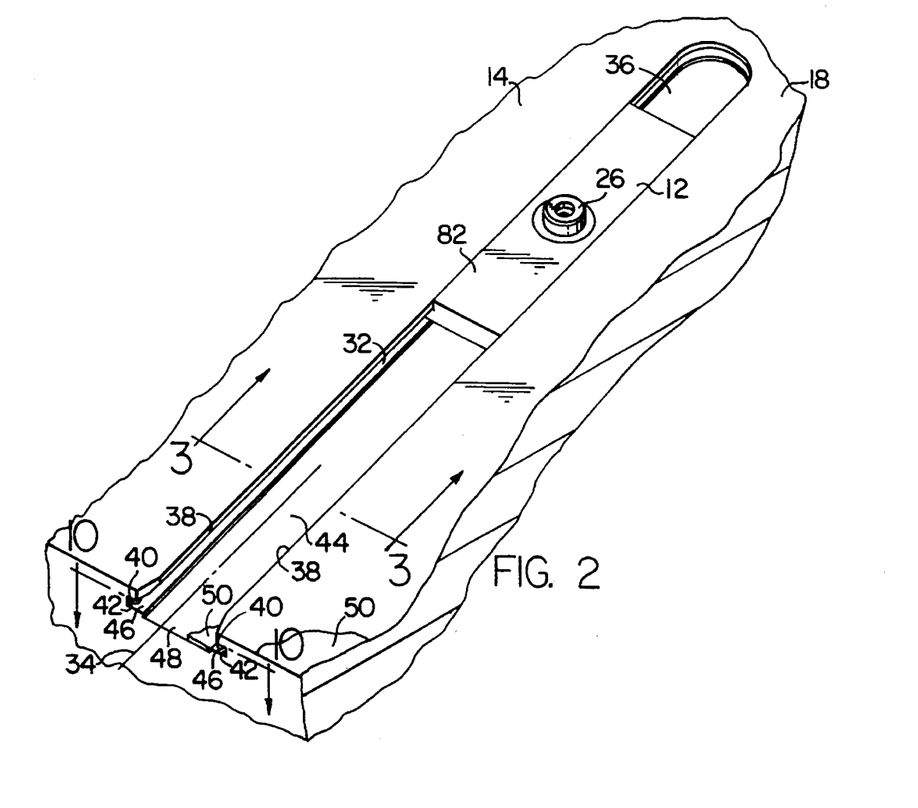
FIG. 2 is a fragmentary perspective view showing the unit and table member of FIG. 1 in greater detail.

Turning to the drawings and first referring to FIGS. 1 and 2, a work locating unit embodying the invention is indicated at 12 and in these figures is shown in use with a table member 14. The table member may broadly be part of any one of a wide variety of machines for performing work operations on workpieces with the workpieces typically being handled in batches with the workpieces of any one batch being substantially identical to one another. The table member may therefore take on various different sizes and shapes and may be otherwise designed and equipped to suit the particular machine with which it is used. In the illustrated case the table member 14 is taken to be one forming part of an automated optical inspection machine for inspecting circuit boards in either finished or partially finished states. As such inspection machines are well known in the art and in themselves form no part of the present invention, further details of the machine with which the table member 14 is used are not shown or described.

The table member has a planar horizontal upwardly facing work supporting surface 18. In FIG. 1 the table member is shown holding in place, as a workpiece, a circuit board 16 which is one of a batch of many such circuit boards to be placed one at a time on the supporting surface 18 to be optically inspected by the associated machine; and for the inspection process it is critical that the circuit board 16 be accurately located at a desired position on the supporting surface 18 of the table member and that such accuracy be repeatedly obtained as the circuit boards of the given batch are successively placed onto the table member. For this purpose, the circuit board 16 includes a pair of locating features in the form of one hole 20 and one slot 22 for cooperation with two workpiece locating devices fixed relative to the supporting surface of the table. The first of these locating devices is a first pin 24 passing through the hole 20 in the circuit board 16, and the second of these locating devices is a second pin 26 forming part of the unit 12 and passing through the slot 22 of the circuit board.

The pins 24 and 26 are dimensioned to fit into the hole 20 and slot 22 of the circuit board 16 with essentially no looseness existing between the pins and the circuit board and therefore hold the circuit board against any movement relative to the table member in the plane of the supporting surface 18. In a given batch of identical circuit boards the holes 20 and slots 22 are identically located from board to board so that as each board is placed onto the table member 14 in mating relationship with the locating pins 24 and 26 that board will assume the same position on the supporting surface 18 as all other boards of the same batch.

The illustrated locating pins 24 and 26 are not designed to aid in holding a circuit board vertically to the supporting surface 18. To perform this vertical holding function the table member 14 includes a large number of small openings 28 distributed over the entire supporting surface 18 to which openings vacuum may be supplied in well-known ways to attract and hold a circuit board to the supporting surface 18 during a work procedure.

Since the circuit boards with which the table 14 is used may vary in size and shape and in the positioning of their locating holes 20 and slots 22 from one batch to another, it is often necessary to change the positions of the locating pins 20 and 22 in advance of processing a new batch of circuit boards. To accommodate this change in pin position the pin 24 is designed to be insertable in and fixed to any selected one of a number of bushings 30 carried by the table member 14 and placed at strategic fixed points on the supporting surface 18. The locating unit 12 is in turn slidably receivable in any one of a number of T-slots 32 formed in the table 14 and is slidable to and lockable at any point along the length of each slot.

Figures 3, 4, 5:
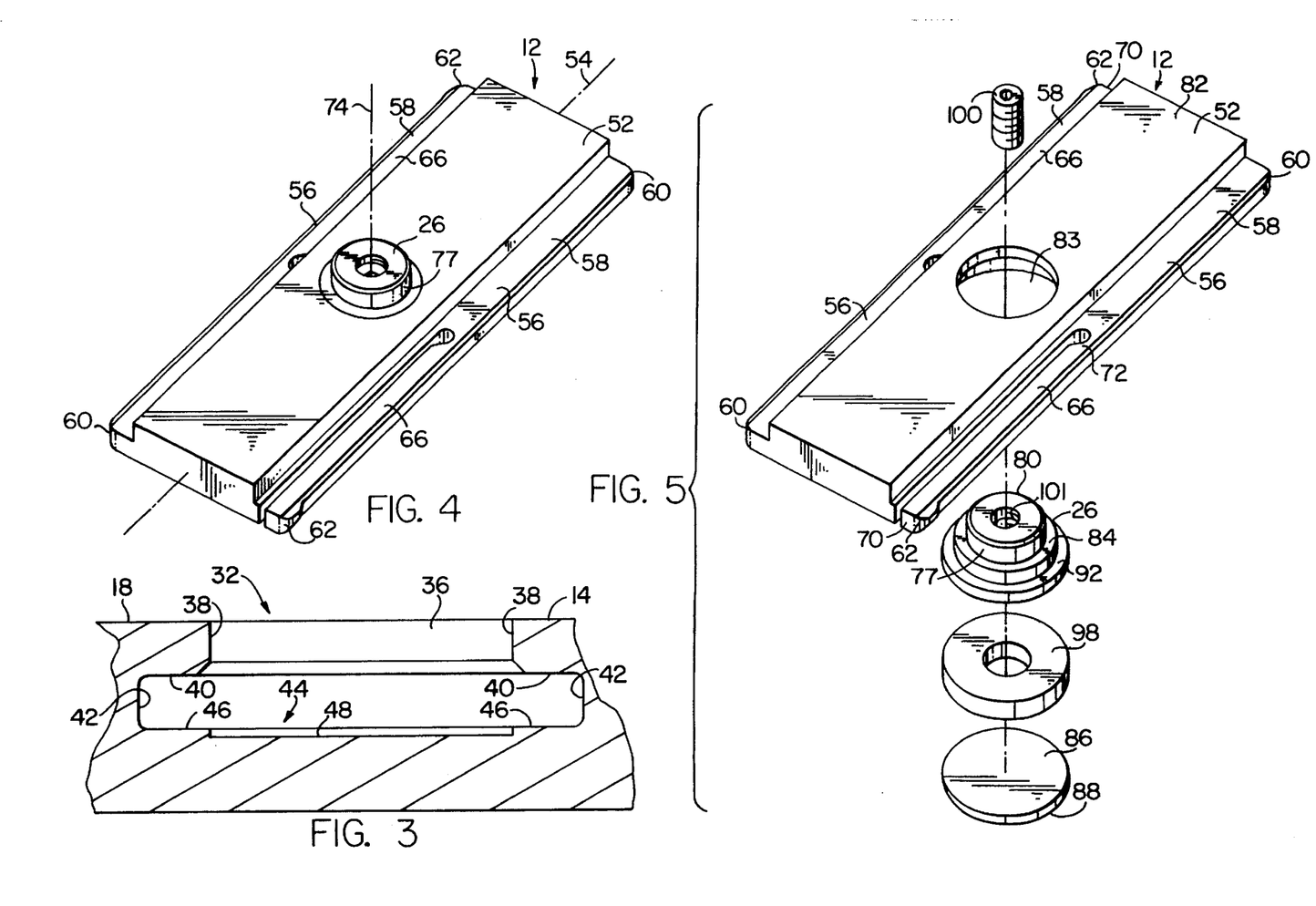
FIG. 3 is a fragmentary vertical sectional view taken through the table on the line 3—of FIG. 2.
FIG. 4 is a perspective view of the unit of FIG. 1.
FIG. 5 is an exploded perspective view of the unit of FIG. 1.

As shown best in FIGS. 2 and 3 each slot 32 in the table member 14 is of an essentially inverted T-shape, has a center line 34 running parallel to the supporting surface 18 and has a mouth 36 communicating with the supporting surface 18 and defined by two laterally spaced vertical surfaces 38. Below the mouth 36 and on opposite sides of it are two downwardly facing planar guide faces 40 located in a common horizontal plane parallel to the supporting surface 18. A vertical guide surface 42 extends downwardly from the inner side edge of each downwardly facing guide surface 40 to an upwardly facing bottom surface 44. The center line 34 is located in a vertical plane exactly midway between the two vertical slot surfaces 42.

The bottom surface 44 of the slot consists of two upwardly facing co-planar surfaces 46 each located directly below a respective one of the downwardly facing guide surfaces 40, and a planar middle surface 48 extending between the two upwardly facing surfaces 46 and recessed relative to said upwardly facing surfaces 46 so as to be located in a plane slightly below the plane of the surfaces 46. The recessing of the middle surface 44 below the level of the surfaces 46 has the advantage that if desired the surface 44 may be coated with a layer of material 50 of low light reflectivity, while the two upwardly facing surfaces 46 are kept free of such coating, without that coating interfering with the slidability of the work locating unit 12 along the length of the slot. When, as in the illustrated case, the table member 14 is one forming part of an optical inspection machine its work supporting surface 18 is often coated with a material 50 of low light reflectivity, as shown in FIG. 2, and the application of a coating of such material to the middle surface 48 of the bottom of the slot inhibits the production of unwanted stray light reflections from that surface.

Figure 9:
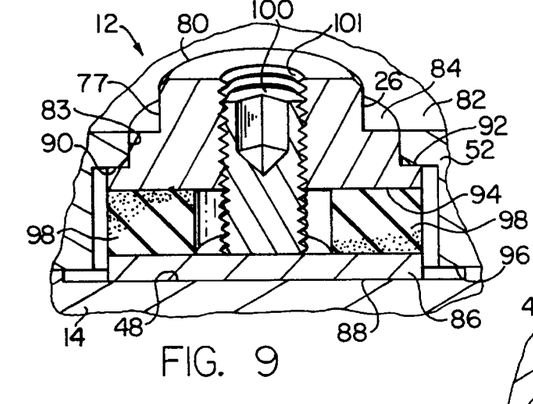
FIG. 9 is a fragmentary view partially in perspective and partially in vertical section showing the locking means of the unit of FIG. 1.
Figure 10:
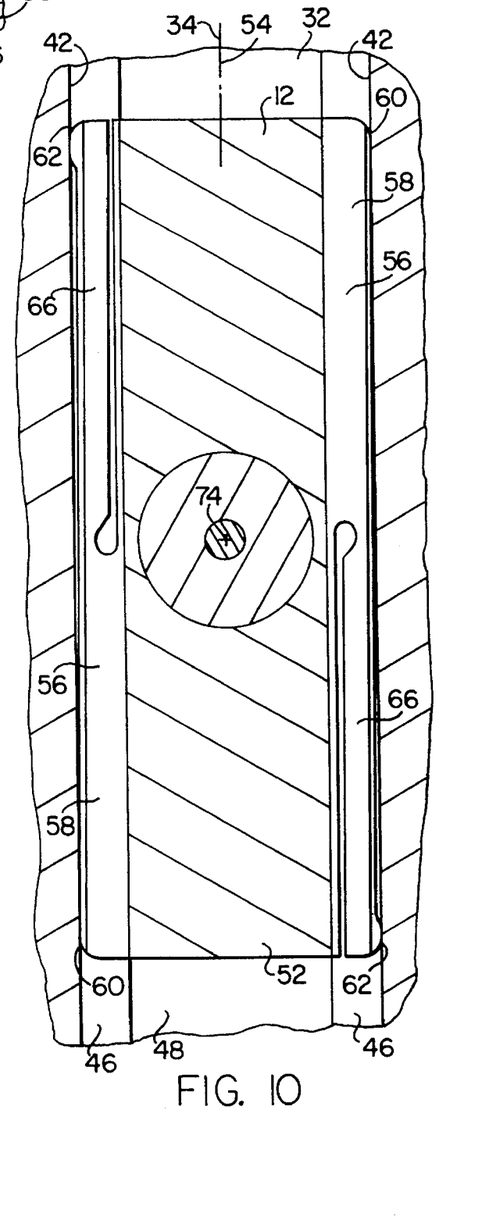
FIG. 10 is a horizontal sectional view taken on the line 10—10 of FIG. 2.

The details of the construction of the slidable work locating unit 12 are shown in FIGS. 4 to 10. Referring to these figures the unit 12 includes a slide body 52 which can broadly be any one of many different sizes and shapes to suit it to a particular application. In the illustrated instance, however, the slide body 52 is of generally rectangular shape as seen from above, as in FIG. 6, and has a longitudinal axis 54 running essentially parallel to the center line 34 of the slot 32 in which the unit 12 is received. Two side portions 56,56 extend along the slide body 52 and have upwardly facing guide surfaces 58. When the slide unit is received in a slot 32, as shown in FIG. 10, the two side portions 56 of the slide body are received in the spaces between the downwardly facing guide surfaces 40 and the upwardly facing bottom surfaces 46 with the upwardly facing guide surfaces 58 of the side portions being engageable with the downwardly facing guide surfaces 40 of the slot to limit upward movement of the slide body relative to the table member 14.

Figure 6:
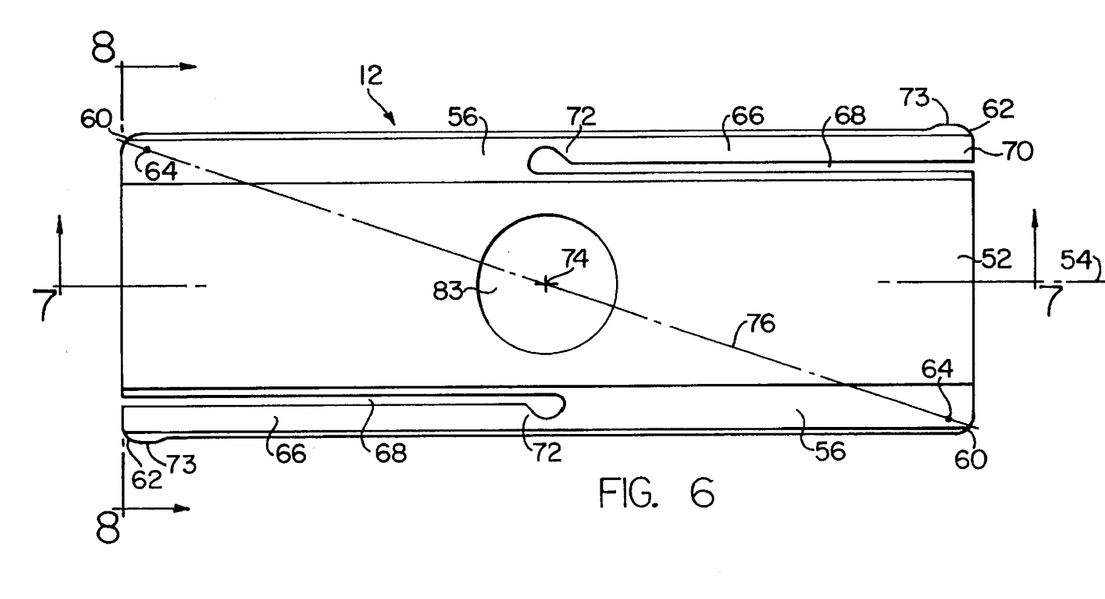
FIG. 6 is a plan view of the slide body of the unit of FIG. 1.
Figure 7:
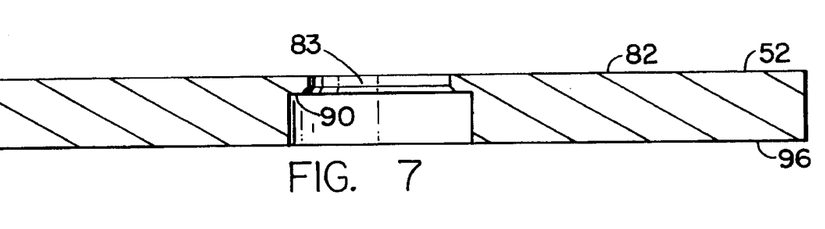
FIG. 7 is a vertical sectional view taken on the line 7—7 of FIG. 6.
Figure 8:
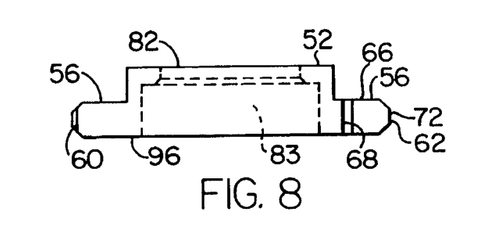
FIG. 8 is an end view of the slide body of FIG. 1 taken looking in the direction of the arrows 8—8 of FIG. 6.

As seen in FIGS. 4, 5 and 6, the rectangular shape of the slide body 52 provides the body with four corners, two of which are on each one of the two side portions 56. At two diametrically opposed ones of these corners are two rigid abutment surfaces 60 which are rigidly fixed relative to the remainder of the slide body; and on the other two diametrically opposed corners are two resilient abutments surfaces 62 which are resiliently moveable laterally of the remainder of the slide body in the direction toward the longitudinal axis 54. The two rigid abutment surfaces are arcuately curved about vertical axes 64, as shown in FIG. 6, and have identical radii of curvature.

The two resilient abutment surfaces 62 of the slide body 52 are located on arms 66 which are integrally connected with the remainder of the slide body with each being formed by a slit 68 in the associated side portion 56 which slit extends longitudinally from adjacent the associated resilient abutment surface 62 toward the rigid abutment surface 60 of the same side portion 56 to provide the arm 66 with a free end 70 and an opposite end 72 fixed to the slide body. The two resilient abutment surfaces 62 are located on the free ends 70 of the arms 66 and are formed by laterally outwardly extending protrusions 73.

The two rigid abutment surfaces 60 are spaced from one another in the direction perpendicular to the longitudinal axis 54 by a distance smaller than the spacing between the two resilient abutment surfaces 62 in the same direction. Further, the spacing between the two rigid abutment surfaces 60 is slightly smaller than the horizontal spacing between the vertical surfaces 42 of the slot 32 while the spacing between the resilient abutment surfaces, when the slide unit 12 is out of the slot 32 with no forces applied to the resilient abutment surfaces 62, is slightly greater than the spacing between the vertical surfaces 42 of the slot. Therefore, as shown in FIG. 10, when the slide unit 12 is in a slot 32 the two resilient abutment surfaces 62 are held in slightly laterally inwardly deflected states by the vertical surfaces 42,42 of the slot, and since these surfaces are spaced from one another along the longitudinal axis 54 they urge the slide body 52 about the vertical axis 74 to bring the rigid abutment surfaces 60 into engagement with the slot vertical surfaces 42 and to hold them in engagement with said vertical surfaces.

The engagement of the rigid abutment surfaces of the slide body 52 with the vertical surfaces 42 of the slot is maintained as the slide body is moved from one position to another along the length of the slot. Further, the vertical axis 74 of the pin portion 26 of the locating unit 12 is arranged so as to pass through the midpoint of the straight line 76 connecting the two axes of curvature of the two rigid abutment surfaces 60, and as a result of this the pin axis 74, by virtue of the continual contact of the rigid abutment surfaces 60 with the vertical slot walls 42, is kept continually in intersecting relationship with the center line 34 of the slot.

The pin portion 26 of the slide unit 12 may be implemented in various different ways and may have various different sizes and shapes without varying from the broader aspects of the invention. In the illustrated case, however, it has a cylindrical outer surface 77 concentric with the axis 74 and is provided by a circular insert 80 received and fixed in a conforming opening 83 in the slide body 52, as seen in FIGS. 5 and 9. As also seen in these figures, and in FIG. 2, the slide body 52 preferably includes a portion extending upwardly above the upwardly facing surfaces 58 of the side portions 56, which upper portion is received in the mouth 36 of the slot 32 and has a planar upper surface 82 co-planar with the work supporting surface 18 of the table member 14 when the upwardly facing surfaces 58 of the slide body are engaged with the downwardly facing guide surfaces 40 of the slot. The pin portion 26 extends upwardly from the upper surface 82 of the slide body, and surrounding the pin portion 26 the insert 80 has an upwardly facing annular surface 84 co-planar with the upper surface 82 so that the insert surface 84 and slide body upper surface 82 both form continuations of the workpiece supporting surface 18 of the table member 14 and provide vertical support for the circuit board or other workpiece in the vicinity of the pin portion 26.

The work locating unit 12 also preferably includes a locking means for securing it to the table member at any position to which it may be moved in the slot 32. As shown in FIGS. 5 and 9 this locking means comprises a circular disc locking member 86 having a downwardly facing locking surface 88 of relatively large extent. The insert 80 and the opening 83 in the slide body are of conforming stepped shapes so that the opening 83 has a downwardly facing annular shoulder 90 and the insert 80 has an upwardly facing shoulder 92, which shoulders 90 and 92 co-engage to limit movement of the insert upwardly relative to the slide body beyond the position shown in FIG. 9. The insert is also fixed to the slide body, as by being press fit into and/or adhesively secured in the opening 83 in the slide body, so as to be held against movement downwardly from the position shown in FIG. 9. The insert has a downwardly facing bottom surface 94 located above the bottom surface 96 of the slide body and the locking member 88 is partially received in the recess formed in the slide body by the opening 83 below the insert 80 for movement vertically toward and away from the middle bottom surface 48 of the slot. Between the locking member 86 and insert 80 is an annulus 98 of resilient foam material having a lower face adhesively secured to the upper surface of the locking member 88 and an upper face adhesively secured to the bottom surface 94 of the insert 80. The resilient annulus 98 therefore tends to hold the locking member 88 in an upper retracted position out of engagement with the slot bottom surface 48 and resiliently resists its movement toward an advanced or locking position at which it tightly engages the slot bottom surface 48.

A set screw 100 is threadably received in a threaded opening 101 passing centrally through the insert 80. The upper end of the set screw 100 is accessible to an operator for manual rotation of the screw, and the lower end of the screw passes through the resilient annulus 96 and engages the locking member 88. Therefore, by rotation of the set screw 100 in one direction or the other the locking member 88 can be readily brought into and out of locking engagement with the slot surface 48. It should further be noted that the direction in which the set screw 100 and the opening 101 are threaded is selected to be such that as the screw 100 is turned to move the locking member 88 downwardly into tight engagement with the slot surface 48 the direction in which such rotation of the screw tends to rotate the slide body 42 is that direction which moves the rigid abutment surfaces 60 of the slide body toward the vertical surfaces 42 of the slot.

Figure 11:
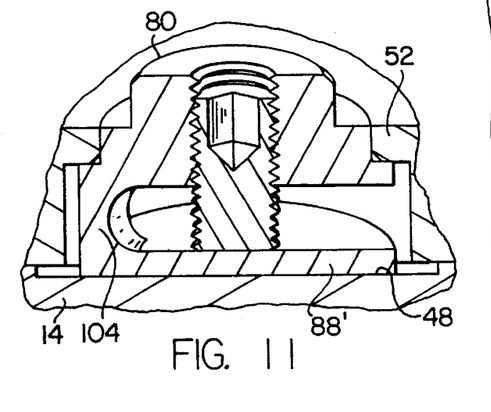
FIG. 11 is a view similar to FIG. 9 but showing an alternate embodiment of the invention.

Various different versions of the locking means may be used with the work locating unit 12, and one such other version in shown in FIG. 11. Referring to this figure the locking means there shown is generally similar to that of FIG. 9 but includes a locking member 88' which, instead of being entirely separate from the insert 80 is, along one short portion of its periphery, integrally connected with the remainder of the insert by a small bridging portion 104. The bridging portion 104 resiliently connects the locking member 88' to the remainder of the insert 80 and thereby essentially replaces the resilient annulus 98 of FIGS. 5 and 9.

We claim:

1. A workpiece holding table member having a planar upwardly facing horizontal work supporting surface and an elongated T-slot with a central axis running parallel to said work supporting surface and having a mouth communicating with said work supporting surface; in combination with a workpiece locating unit slidably received in said T-slot; said slot below said mouth having two downwardly facing upper guide surfaces located on opposite sides of said mouth, two vertical guide surfaces each extending downwardly from a respective one of said upper guide surfaces, and an upwardly facing bottom surface extending between said vertical guide surfaces and spaced below said two upper guide surfaces; said unit including a slide body having a longitudinal axis generally parallel to the central axis of said slot and having two side portions located on opposite sides of said longitudinal axis each of which side portions is received between a respectively associated one of said upper guide surfaces and said bottom surface of said slot, said side portions further each having a rigid abutment surface rigidly fixed relative to the remainder of said slide body and a resilient abutment surface resiliently movable horizontally relative to the remainder of said slide body in the direction toward said longitudinal axis, said two rigid abutment surfaces of said two side portions, when said unit is out of said sloe with no lateral forces applied to said resilient abutment surfaces, being spaced from one another in the direction perpendicular to said longitudinal axis by a distance less than the spacing between said two vertical guide surfaces of said slot and being spaced from one another in the direction of said longitudinal axis, and said two resilient abutment surfaces of said two side portions being spaced from one another in the direction perpendicular to said longitudinal axis by a distance greater than said spacing between said two vertical guide surfaces of said slot and being spaced from one another in the direction of said longitudinal axis so that said two resilient abutment surfaces resiliently engage said two vertical guide surfaces and urge said slide body about a vertical axis causing said rigid abutment surfaces to be held in engagement with said two vertical guide surfaces of said slot, and means carried by said slide body defining a workpiece locating device within the vertically extending zone of said slot mouth.

2. The combination defined in claim 1 wherein said slide body as seen looking onto it from above is of generally rectangular shape with four corners, said two rigid abutment surfaces being located at two diagonally opposite ones of said four corners and said two resilient abutment surfaces being located at the other two diagonally opposite ones of said four corners.

3. The combination defined in claim 2 wherein each of said side portions of said slide body includes a resilient arm formed by a slit in said side portion extending from adjacent the resilient corner of said side portion toward the one of said rigid corners associated with said side portion so that said arm has a free end and an opposite end integrally connected with the remainder of said slide body, said resilient abutment surfaces being formed on the free ends of said resilient arms.

4. The combination defined in claim 3 wherein said resilient abutment surfaces on said free ends of said arms are provided by laterally outwardly extending protrusions on the outer ends of said arms.

5. The combination defined in claim 2 wherein said rigid abutment surfaces are arcuately curved about vertical axes of curvature and have identical radii of curvature, said workpiece locating device has a vertical center axis passing through the middle point of the line connecting the two axes of curvature of said two rigid abutment surfaces.

6. The combination defined in claim 5 wherein said workpiece locating device is a pin extending from said slot mouth upwardly beyond the plane of said work supporting surface of said table member, and said pin has a cylindrical outer surface concentric with said vertical center axis.

7. The combination defined in claim 1 wherein each of said side portions of said slide body has an upwardly facing guide surface engageable with the associated one of said downwardly facing upper guide surfaces of said slot, and wherein said workpiece locating unit further includes a locking means carried by said slide body and having a locking member with a downwardly facing locking surface facing said bottom surface of said slot, and means carried by said slide body for selectively moving said locking member vertically relative to said slide body to bring it into and out of locking engagement with said bottom surface of said slot.

8. The combination defined in claim 7 wherein said slide body has a bottom surface facing said bottom surface of said slot and has a recess communicating with said bottom surface of said slide body and extending upwardly from said bottom surface of said slide body, said locking member being received in said recess for vertical movement relative said slide body, and said means for selectively moving said locking member is a screw carried by said slide body and supported for threadable rotation relative to said slide body about a vertical axis passing through the mouth of said slot, said screw having an upper end manually rotatable by an operator and a lower end engageable with said locking member for moving said locking member toward and away from said bottom surface of said slot in response to rotation of said screw.

9. The combination defined in claim 8 wherein said locking member is a part separate from said slide body, and wherein said locking means includes a spring means between said locking member and said slide body for urging said locking member toward a retracted position at which the downwardly facing surface of said locking member is positioned above said bottom surface of said slot and for resiliently resisting movement of said locking member toward said bottom surface of said slot and away from said retracted position.

10. The combination defined in claim 9 wherein said spring means is a layer of resilient material having an upper face fixed relative to said slide body and a lower face fixed to said locking member.

11. The combination defined in claim 7 wherein said locking member has a periphery in a substantially horizontal plane, said locking member along most of said periphery being separate and vertically spaced from said slide body and along a small portion of said periphery being connected by a bridging portion with said slide body which bridging portion urges said locking member toward a retracted position at which the downwardly facing surface of said locking member is spaced above said bottom surface of said slot and resiliently resists movement of said locking member away from said retracted position and downwardly toward said bottom surface of said slot.

12. The combination defined in claim 11 wherein said slide body has a circular opening passing therethrough, and said means defining a workpiece locating device is a circular insert fixed in said circular opening of said slide body.

13. The combination defined in claim 12 wherein said circular opening in said slide body and said insert are of complementary stepped shapes defining a horizontal downwardly facing annular shoulder surface on said slide body and an upwardly facing surface on said insert engageable with said shoulder surface of said opening to limit upward movement of said insert relative to said slide body.

14. The combination defined in claim 13 wherein said slide body has a bottom surface facing said bottom surface of said slot, said insert has a bottom surface located above the bottom surface of said slide body so that the lower portion of said opening in said slide body defines a recess below said bottom surface of said insert, said locking member being located in said recess and said means for moving said locking member being a screw threadably received by said insert and engageable with said locking member.

15. The combination defined in claim 14 wherein said locating device is a locating pin extending upwardly from said slide body and beyond said supporting surface of said table member, said locating pin being a portion of said insert, and said insert having a threaded opening extending through said locating pin portion of said insert and the remainder of said insert, said screws being threadably received in said threaded opening.

16. The combination defined in claim 7 further characterized by said slide body having an upper portion located in said mouth of said T-slot of said work supporting table, said upper portion of said slide body having a planar upwardly facing upper surface which is co-planar with said work supporting surface of said table member when said locking member of said locking means is tightly engaged with said bottom surface of said slot.

17. The combination defined in claim 1 wherein said bottom surface of said slot includes two upwardly facing guide surfaces each located directly below a respective one of said downwardly facing guide surfaces of said slot, and a middle upwardly facing middle surface extending between said two upwardly facing guide surfaces of said slot, said middle surface being located at a level below said two upwardly facing guide surfaces of said slot and being coated with a layer of material of low light reflectivity, said work supporting surface of said work holding table being also covered with a layer of material of low light reflectivity, said two upwardly facing guide surfaces of said slot being free of said material of low light reflectivity.

18. A workpiece locating unit for use with a work holding table member having a T-slot for slidably receiving the unit, said unit comprising a slide body carrying a workpiece locating device and having a longitudinal axis and a generally rectangular shape with four corners as viewed from above, two of said four corners which are located diagonally opposite to one another having two rigid abutment surfaces rigidly fixed relative to the remainder of said slide body, and the other two of said four corners which are diagonally opposite to one another having two resilient abutment surfaces movable resiliently relative to the remainder of said slide body in the direction toward said longitudinal axis, said two rigid abutment surfaces in the direction perpendicular to said longitudinal axis being spaced from one another by a distance smaller than the spacing between said resilient abutment surfaces in the direction perpendicular to said longitudinal axis.

19. A workpiece locating unit as defined in claim 18 wherein said slide body has two longitudinally extending side portions as seen from above said slide body each of which side portions includes a resilient arm formed by a slit in said side portion extending from one of the resilient corners of said slide body toward the one of said rigid corners associated with the same side portion of said slide body so that said arm has a free end and an opposite end integrally connected with the remainder of said slide body, said resilient abutment surfaces being formed on the free ends of said resilient arms.

20. A workpiece locating unit as defined in claim 19 wherein said slide body has a bottom surface, said slide body further includes a locking member carried by said slide body adjacent said bottom surface for vertical movement relative to said slide body between an upper retracted position and a lower advanced position, said locking member having a downwardly facing locking surface, resilient means between said slide body and said locking member urging said locking member toward said retracted position and resiliently resisting movement of said locking member away from said retracted position and toward said advanced position, and a manually operable screw carried by said slide body for moving said locking member vertically relative to said slide body between said advanced and retracted positions.

21. A workpiece locating unit as defined in claim 19 wherein said workpiece locating device is a workpiece locating pin extending upwardly from said slide body, and a threaded opening extending vertically through said pin, said screw for moving said locking member being received in said threaded opening and having an upper end manually rotatable by an operator and a lower end engaged with said locking member.

* * * * *